United States Patent Office 3,510,555
Patented May 5, 1970

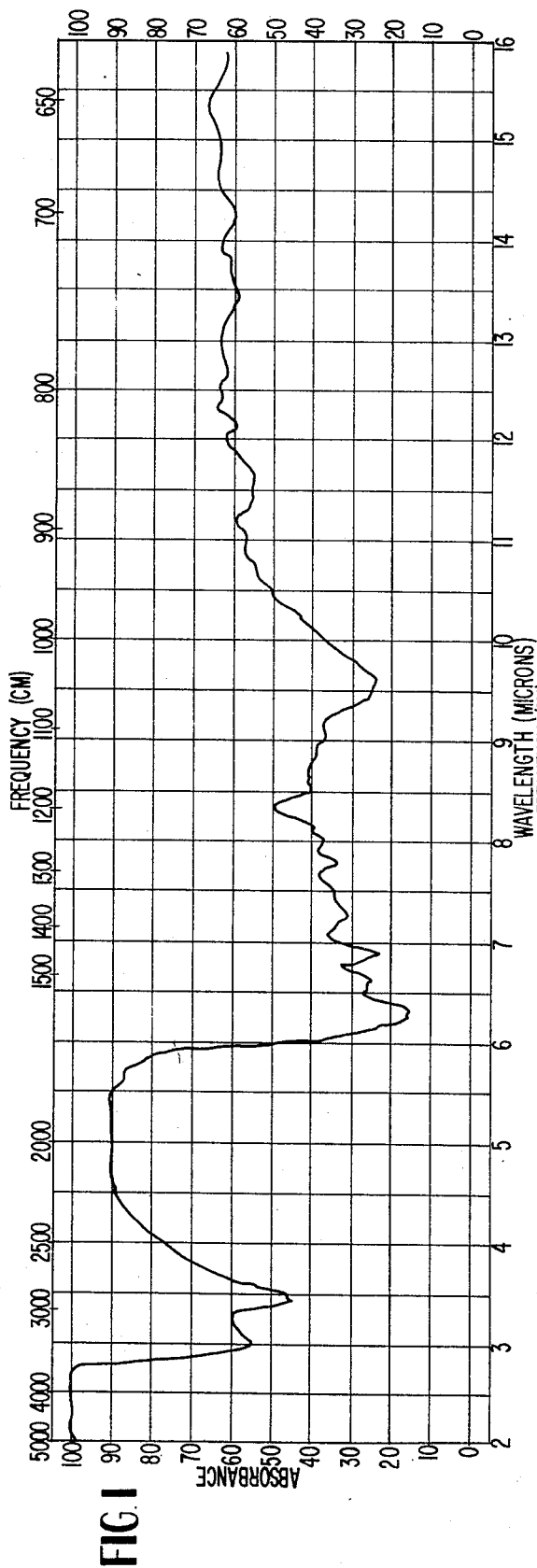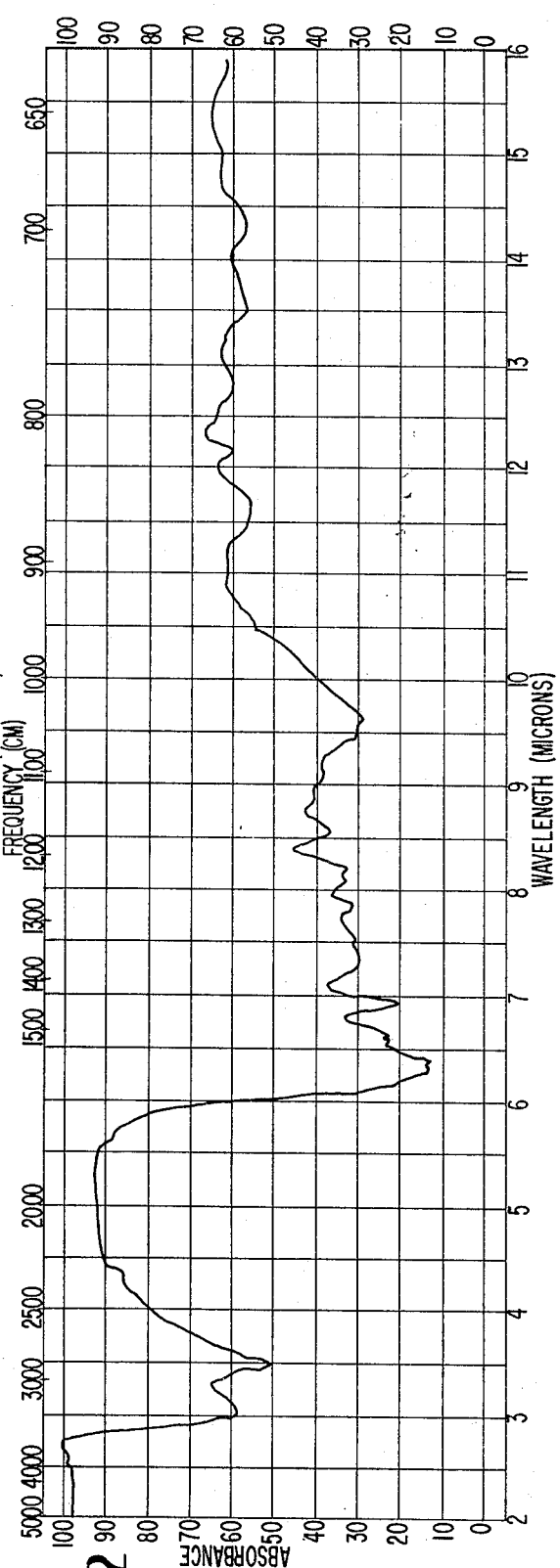

3,510,555
ANTIBIOTICS PREPARED FROM TETRACYCLINE AND GENTAMICIN
Werner Rogalski and Helmut Wahlig, Darmstadt, and Ludwig Hepding, Darmstadt-Eberstadt, Germany, assignors to E. Merck A.G., Darmstadt, Germany
Continuation-in-part of application Ser. No. 568,112, July 27, 1966. This application Sept. 11, 1968, Ser. No. 759,163
Claims priority, application Germany, Aug. 4, 1965, M 66,209
Int. Cl. A61k 21/00
U.S. Cl. 424—119                                  5 Claims

ABSTRACT OF THE DISCLOSURE

A non-antagonistic combination of a tetracycline with a gentamicin, said combination being a compound of the formula:

$$G—(CH_2—NH—CO—T)_n$$

Figure 3:
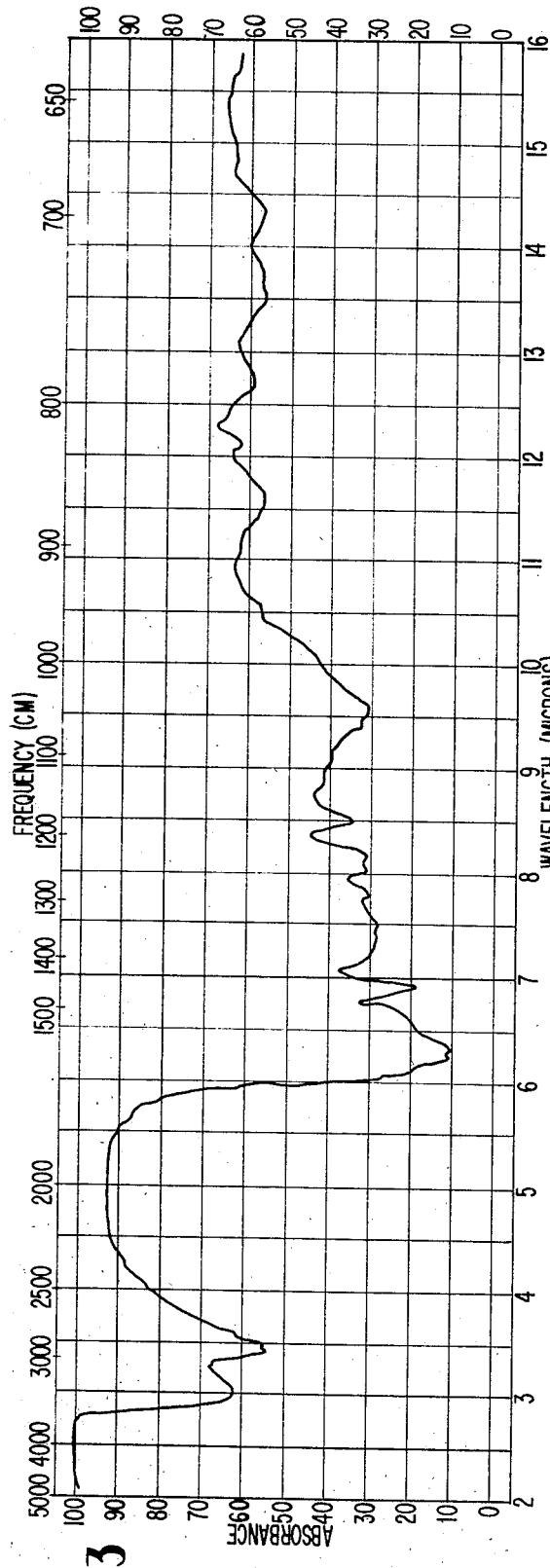

wherein
G represents a gentamicin residue,
T represents a descarboxamido-tetracycline residue, and
$n$ represents an integer of from 1 through 4 inclusive.

---

This application is a continuation-in-part application of application Ser. No. 568,112, filed July 27, 1966, now abandoned.

This invention relates to novel antibiotics, in particular to antibiotics prepared from a tetracycline, gentamicin, and formaldehyde.

It is well known in the treatment of disease that, during treatment, the presence of one antibiotic will often antagonize further killing by another antibiotic. For example, in "Science," vol. 146, Nov. 6, 1964, p. 772, FIG. 1, there is a graph which shows that gentamicin (gentamycin) is rendered substantially completely ineffective by the presence of chloramphenicol. Furthermore, even though the addition of puromycin to gentamicin results in a synergistic effect during the first 20 minutes of bacteria contact, an antagonistic effect is thereafter observed, making the combination ineffective for further killing of the bacterium.

Whereas antagonism between antibiotics has been generally observed, and with gentamicin in particular, there is nevertheless a need for drugs which exhibit the overlapping effect of several antibiotics, as the wider the spectrum is, all other things being equal, the more effective the drug.

A principal object of this invention, therefore, is to provide novel antibiotics having a wide antibacterial spectrum.

More particularly, another object of this invention is a non-antagonistic combination of a tetracycline with a gentamicin, said combination being a compound of the formula:

$$G—(CH_2—NH—CO—T)_n$$

wherein
G represents a gentamicin residue,
T represents a descarboxamido-tetracycline residue, and
$n$ represents an integer of from 1 through 4 inclusive.

Further objects comprise methods of producing such antibiotics, as well as pharmaceutical preparations and methods of administration based on the novel antibiotics.

Upon further study of the specification and claims, other objects and advantages of the present invention will become apparent.

To attain the objectives of this invention, there are provided novel antibiotics based on the reaction product of a tetracycline, a gentamicin, and formaldehyde in a Mannich reaction. Whereas the reaction products are not mere mixtures, it is nevertheless highly surprising that such new products do not exhibit the antagonism found between gentamicin and other bacteriostatic agents. Instead, the novel antibiotics are not only as effective as the reactant antibiotics per se, but in the case of certain bacterial strains, an increase in the efficacy of the reaction product is exhibited. Of even further importance is that the antibacterial spectrum of the reaction product is widened in comparison to that of a tetracycline or gentamicin, taken alone.

The attached drawings are graphical representations of the infrared spectra of specific compounds of the invention.

According to this invention, gentamicin is reacted with 1–4 mols of a tetracycline and 1–4 mols of formaldehyde to obtain a Mannich condensation product. This product can then be converted in a conventional manner into a pharmaceutically acceptable acid addition salt.

As for the tetracycline that can be used as the reactant, it can be employed in the form of the base or as an acid addition salt thereof. By "a tetracycline" is meant not only tetracycline itself, but also the therapeutic derivatives thereof, such as, for example, 7-chlortetracycline, 5-oxytetracycline, desmethyltetracycline, as well as the isomers and anhydro compounds of these substances.

With respect to the gentamicin, attention is directed to the description given in U.S. patent specification No. 3,091,572. This antibiotic is effective in inhibiting the growth of gram-positive, gram-negative and acid-fast bacteria, being a basic organic substance having the following elementary analysis: C=50.20%, H=8.52%, N=13.47%, O=27.81%, with no other elements present, that has a specific optical rotation as measured by the D line of sodium at 25° C. of 146° in water, at 1% concentration. It is very soluble in water aqueous acidic media, methanol, and acetone and substantially insoluble in ether, benzene and halogenated hydrocarbons. It is transparent to ultraviolet light in the range of 220–400 millimicrons. It has an infrared absorption spectrum when suspended in hydrocarbon oil in solid form substantially as shown in FIG. 1 of U.S. patent specification No. 3,091,572. It has a melting point of about 102–108° C. with decomposition. It has a molecular weight of about 543 as determined ebullioscopically in methanol; and it has a wide antibacterial spectrum. The exact structural formula of gentamicin which probably is a mixture of two or more isomeric compounds has not yet been published.

Gentamicin can also be used as base or in the form of its acid addition salts. The reaction occurs with 1–4 mols of tetracycline or one of its derivatives and with 1–4 mols of formaldehyde. In general, only one of the two antibiotics is used in the form of an acid addition salt.

The reaction between the tetracycline molecule and the gentamicin occurs between the nitrogen of the carboxamide group of the tetracycline, and one or more amino groups of gentamicin—a methylene bridge being introduced by formaldehyde. Taking into consideration the resultant bond between a tetracycline and one of the amino groups, it conforms to the following configuration for the case that 1 molecule of the tetracycline is combined with the gentamicin molecule:

$$G'—NH—CH_2—NH—CO—T$$

wherein G' means the residual part of the gentamicin molecule whereas T is the descarboxamido-tetracycline residue. In all likelihood, the three primary amino groups of the gentamicin molecule react first before the secondary NH-methyl group takes part in the reaction.

By employing varying mol ratios and mixtures of the various possible tetracyclines, a wide variety of final compounds can be obtained. For example, when using only a single tetracycline compound, it is possible to obtain a mono, bis, tri, or tetra (tetracycline-methylene)-gentamicin product. These novel compounds are distinguished one from the other principally by their solubility characteristics. The more mols of tetracycline art attached to the gentamicin, the less soluble is the final product. Thus, for most pharmaceutical uses, it is preferred to employ the more readily soluble mono and bis compounds.

The reaction is carried out under the usual conditions of a Mannich reaction. The formaldehyde necessary for the aminomethylation can be easily employed in the liquid or in polymeric forms. Water or an organic solvent, particularly methanol, can serve as the solvent for the formaldehyde. Generally, for the sake of simplicity, the usual 35% aqueous formaldehyde solutions are utilized. The amount of formaldehyde added (1–4 mols) is adjusted, of course, according to the amount of the tetracycline compound (1–4 mols) used.

The condensation between tetracycline or one of its derivatives, gentamicin, and formaldehyde can be conducted either in a mutual solvent for all three reaction components, or in suspension. Suitable solvents are, for example, alcohols, particularly methanol, n-propanol, isopropanol, n-butanol, and tert.-butanol; cyclic ethers, such as dioxane and tetrahydrofuran; and other organic solvents such as dimethylformamide and dimethylsulfoxide. The reaction can be advantageously carried out at ambient temperature or up to the boiling point of the solvent used.

The resultant compounds can be converted into acid addition salts in a conventional manner. The acids preferred for this conversion are those which yield physiologically acceptable salts. Thus, organic and inorganic acids are used, such as, for example, aliphatic, alicyclic, araliphatic, aromatic, or heterocyclic mono- or polybasic carboxylic or sulfonic acids, such as formic acid, acetic acid, propionic acid, diethylacetic acid, oxalic acid, malonic acid, succinic acid, pimelic acid, fumaric acid, maleic acid, lactic acid, tartaric acid, malic acid, amno-arboxylic acids, benzoic acid, salicylic acid, phenylpropionic acid, citric acid, gluconic acid, ascorbic acid, cinnamic acid, or hydrohalic acids, such as hydrochloric acid. These acid addition salts generally are more readily soluble than the corresponding bases.

The novel compounds can be formulated into the same type of pharmaceutical formulations used in connection with the tetracyclines or gentamicin per se. The novel compounds can thus be administered enterally, parenterally, or topically to mammals as wide-spectrum antibiotics in dosages and forms of administration substantially the same as the reactant tetracyclines and gentamicin.

The novel compounds can be employed with conventional pharmaceutical excipients. Carrier substances can be such organic or inorganic compounds suitable for parenteral, enteral, or topical application and which do not react with the novel compounds, such as, for example, water, vegetable oils, polyethylene glycols, gelatin, lactic sugar, amylose, magnesium stearate, talc, vaseline, etc. For parenteral application, particularly oil or aqueous solutions, as well as suspensions, emulsions, or implants are employed.

For enteral application, furthermore suitable are tablets or dragees which are also characterized by the presence of a carbohydrate carrier or binder. A syrup or the like can also be used wherein a sweetened vehicle is employed.

For topical application, salves or creams which can, if desired, be sterilized or mixed with auxiliary substances, such as preservatives, stabilizers, or wetting agents, or salts for influencing the osmotic pressure, or with buffer substances, are used. The substances of this invention are administered preferably in a dosage of 0.5 to 100 mg. per kg. of body weight, usually several times daily especially in severe cases. Care must be taken, however, since the new compounds, being derivatives of tetracyclines, are subject to the same problems of stability as the basic tetracyclines themselves.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

1.3 g. of a 35% aqueous formaldehyde solution is added to 6.0 g. gentamicin base in 10 ml. methanol. This solution is left at room temperature for 30 minutes, and is then added slowly to a solution of 6.54 g. tetracycline base in 50 ml. isopropanol. After the reactants have been stirred for 2 hours at room temperature under a nitrogen atmosphere, the resultant precipitated crystallizate is filtered, washed well once with isopropanol and several times with absolute ether, and then dried under reduced pressure at 45° C. 9.8 g. (77% of theory) of the monotetracycline-gentamicin product is obtained in the form of a yellow crystalline powder which slowly begins to disintegrate at temperatures over 185° C. The reaction product is very readily soluble in water, its solubility being over 1.9 g./ml. at room temperature. The pH value of a 2% aqueous solution is 8.4–8.6. $(\alpha)_D \sim -50.7°$ (in N/10 methanolic hydrochloric acid).

N-analysis.—Calculated for $C_{40}H_{58}O_{15}N_6$ (percent): N, 9.74. Found (percent): N, 10.0.

The compound produced by this example is identified by the infrared spectrum appearing in FIG. 1, and the compound is named N-[descarboxamidotetracycline-2-carboxamidomethyl]-gentamycin.

EXAMPLE 2

A mixture of 5.0 g. gentamicin base and 2.17 g. of a 35% aqueous formaldehyde solution in 30 ml. isopropanol is added to a solution of 10.9 g. tetracycline base in 130 ml. isopropanol. Next, the reaction mixture is stirred for two hours at room temperature under a nitrogen atmosphere. The resultant precipitate is filtered, washed thoroughly—once with isopropanol and several times with absolute ether—and dried at 45° C. under reduced pressure. 15.5 g. (96% of theory) of a pale yellow condensation product consisting of 2 mols tetracycline and 1 mol gentamicin are obtained. The bistetracycline-gentamicin product disintegrates at temperatures above 185° C. It is comparatively readily soluble in water (about 600 mg./ml. at room temperature). The pH value of a 2% aqueous solution is about 7.3–7.4. $(\alpha)_D \sim -111.9°$ (in N/10 methanolic hydrochloric acid).

Formula:

$$C_{63}H_{82}O_{23}N_8$$

The compound produced by this example is identified by the infrared spectrum appearing in FIG. 2 and the compound is named N,N'-bis-[descarboxamidotetracycline-2-carboxamidomethyl]-gentamycin.

EXAMPLE 3

A mixture of 5 ml. methanol, 4.06 g. gentamicin base, and 2.65 g. of a 35% aqueous formaldehyde solution is added slowly to a solution of 13.29 g. tetracycline base in 150 ml. isopropanol. The reaction mixture is stirred for 2 hours at room temperature under a nitrogen atmosphere. The resultant precipitate is filtered, washed well—with isopropanol and several times with absolute ether—and dried at 45° C. under reduced pressure. 14.4 g. (81% of theory) of a pale yellow crystalline product is obtained. The tritetracycline-gentamicin product disintegrates at temperatures of more than 185° C. $(\alpha)_D \sim -140.8°$ (in N/10 methanolic hydrochloric acid).

The reaction product, in contrast to the mono and bis product, is poorly soluble in water (about 4 mg./ml. at room temperature). The pH value of an 0.2% aqueous solution is about 7.2–7.3.

N-analysis.—Calculated for $C_{86}H_{106}O_{31}N_{10}$ (percent): N, 7.88. Found (percent): N, 7.50.

The compound produced by this example is identified by the infrared spectrum appearing in FIG. 3 and the compound is named N,N′,N″-tris-[descarboxamidotetracycline-2-carboxamidomethyl]-gentamycin.

EXAMPLE 4

A mixture of 1.01 g. gentamicin base and 1.1 ml. of a 35% aqueous formaldehyde solution in 20 ml. isopropanol is added to a solution of 4.44 g. tetracycline base in 60 ml. isopropanol. The reaction mixture is then stirred at room temperature under a nitrogen atmosphere for 3 hours. The resultant precipitated condensation product is filtered, washed once with isopropanol and several times with absolute ether, and then dried at 45° C. under reduced pressure. The product disintegrates at temperatures from 185° C. Yield: 5.4 g. (94% of theory). Formula:

$$C_{109}H_{130}O_{39}N_{12}$$

Molecular weight: 2232.34.

Figure 4:
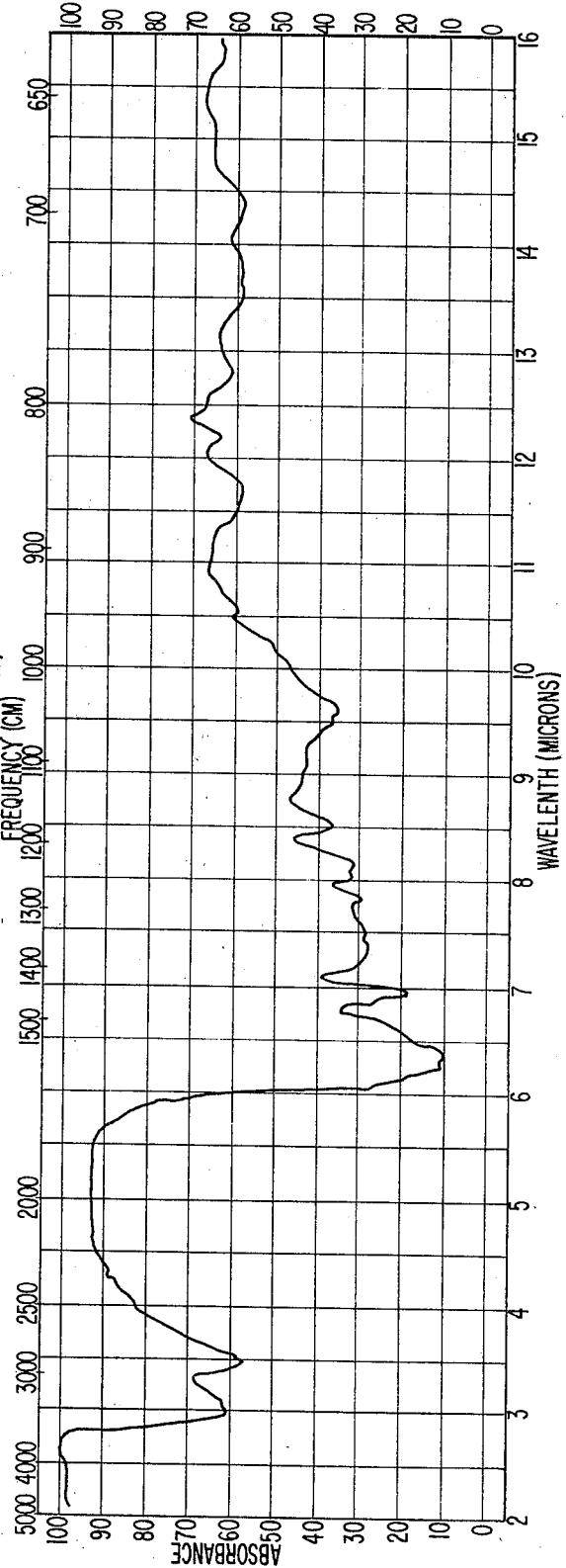

The compound produced by this example is identified by the infrared spectrum appearing in FIG. 4 and the compound is named N,N′,N″,N‴-tetrakis-[descarboxamidotetracycline-2-carboxamidomethyl]-gentamycin.

The following example is to demonstrate a pharmaceutical preparation containing one of the new compounds:

Injection solution 20 g. of the gentamicin product obtained according to Example 1 are dissolved in 250 ml. of water suitable for injection. The solution is passed through a filter retaining bacteria. The solution is filled aseptically into ampoules which are then freeze-dried.

The new compounds were tested according to the method described in Drug Research, vol. 10, page 440, 1960, and vol. 16, page 1, 1966. The respective dosages were administered subcutaneously to mice. The infection micro-organisms were *Streptococcus pyogenes*, *Pneumococcus mucosus*, *Salmonella cholrea suis*, *Streptococcus aronson*, *Klebsiella pneumoniae* and *Proteus vulgaris*.

The curative dosages (D. cur. 50) were determined in mg./kg.

The preceding examples can be repeated with similar success by using, instead of tetracycline, the desmethyl, oxy, or chlor derivatives thereof, to obtain the corresponding mono, bis, tri, and tetra desmethyl, oxy, or chlortetracycline-gentamicin products. Furthermore, a mixture of at least two of tetracycline, desmethyl-tetracycline, oxytetracycline, and chlortetracycline can be employed as reactants to obtain correspondingly mixed products wherein the gentamicin is connected to at least two different species of tetracycline, desmethyl-tetracycline, oxytetracycline, and chlortetracycline. The same also applies to isomers and anhydro derivatives thereof.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A compound selected from the group consisting of:
   (a) N-[descarboxamidotetracycline-2-carboxamidomethyl]-gentamycin having the empirical formula $C_{40}H_{58}O_{15}N_6$ and the infrared spectrum substantially as shown in FIG. 1;
   (b) N,N′-bis-[descarboxamidotetracycline-2-carboxamidomethyl]-gentamycin having the empirical formula $C_{63}H_{82}O_{23}N_8$ and the infrared spectrum substanially as shown in FIG. 2;
   (c) N,N′,N″-tris-[descarboxamidotetracycline-2-carboxamidomethyl]-gentamycin having the empirical formula $C_{86}H_{106}O_{31}N_{10}$ and the infrared spectrum substantially as shown in FIG. 3; and
   (d) N,N′,N″,N‴-tetrakis-[descarboxamidotetracycline-2-carboxamidomethyl]-gentamycin having the empirical formula $C_{109}H_{130}O_{39}N_{12}$ and the infrared spectrum substantially as shown in FIG. 4.

2. A compound as defined by claim 1 wherein said compound is said N-[descarboxamidotetracycline-2-carboxamidomethyl]-gentamycin.

3. A compound as defined by claim 1 wherein said compound is said N,N′-bis-[descarboxamidotetracycline-2-carboxamidomethyl]-gentamycin.

4. A compound as defined by claim 1 wherein said compound is said N,N′,N″-tris-[descarboxamidotetracycline-2-carboxamidomethyl]-gentamycin.

5. A compound as defined by claim 1 wherein said compound is said N,N′,N″,N‴-tetrakis-[descarboxamidotetracycline-2-carboxamidomethyl]-gentamycin.

References Cited

UNITED STATES PATENTS 3,091,572   5/1963   Luedemann et al. ____ 424—118

FOREIGN PATENTS 1,073,213   6/1967   Great Britain.

ALBERT T. MYERS, Primary Examiner
J. D. GOLDBERG, Assistant Examiner

U.S. Cl. X.R.
424—120